(12) United States Patent
Liu et al.

(10) Patent No.: US 7,818,279 B2
(45) Date of Patent: Oct. 19, 2010

(54) EVENT DETECTION BASED ON EVOLUTION OF CLICK-THROUGH DATA

(75) Inventors: Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/375,610

(22) Filed: Mar. 13, 2006

(65) Prior Publication Data

US 2007/0214115 A1  Sep. 13, 2007

(51) Int. Cl.
G06N 7/00 (2006.01)
G06N 7/08 (2006.01)
(52) U.S. Cl. ...................................................... 706/55
(58) Field of Classification Search ........................ None
See application file for complete search history.

(56) References Cited

U.S. PATENT DOCUMENTS

| | | | |
|---|---|---|---|
| 6,839,680 | B1 | 1/2005 | Liu et al. |
| 2004/0236576 | A1 | 11/2004 | Thiesson et al. |

OTHER PUBLICATIONS

'Exact indexing of dynamic time warping': Keogh, 2004, Springer-Verlag, Knowledge and information systems.*
'Query Expansion by Mining User Logs': Cui, Aug. 2003, IEEE, 1041-4347/03, pp. 829-839.*
Cui, Query Expansion by Mining User Logs, Jul./Aug. 2003, IEEE Transactions on Knowledge and Data Engineering, vol. 15, No. 4, pp. 829-839.*
Adamic, Lada A. and Eytan Adar, "Friends and Neighbors on the Web," TR HP, 2001, 9 pages.
Allan, James, Courtney Wade and Alvaro Bolivar, "Retrieval and Novelty Detection at the Sentence Level," SIGIR'03, Jul. 2003, Toronto, Canada, © 2003 ACM, pp. 314-321.
Beeferman, Doug and Adam Berger, "Agglomerative clustering of a search engine query log," SIGKDD 2000, 10 pages.
Bondy, J.A. and U. S. R. Murty, "Ch.9.2 Dual Graphs," Graph Theory With Applications, 1976, American Elsevier Publishing Co., Inc., pp. 139-143.
Cai, Deng et al., "Mining Hidden Community in Heterogeneous Social Networks," LinkKdd'05, Aug. 2005, Chicago, © 2005 ACM, 8 pages.
Chen, Chaomei and Les Carr, "Trailblazing the Literature of Hypertext: Author Co-Citation Analysis (1989-1998)," Hypertext 99, Darmstadt, Germany, © 1999 ACM, pp. 51-60.
Cui, Hang et al., "Probabilistic Query Expansion Using Query Logs," WWW May 2002, Honolulu, Hawaii, ACM, pp. 325-332.
Flake, Gary William, Steve Lawrence and C. Lee Giles, "Efficient Identification of Web Communities," ACM SIGKDD 2000, August, Boston, MA, pp. 150-160.

(Continued)

*Primary Examiner*—Donald Sparks
*Assistant Examiner*—Peter Coughlan
(74) *Attorney, Agent, or Firm*—Perkins Coie LLP (57) ABSTRACT

A method and system for detecting events based on query-page relationships is provided. The event detection system detects events by analyzing occurrences of query-page pairs generated from a user selecting the page of the pair from a search result for the query of the pair. The event detection system may identify semantic and temporal similarity between query-page pairs. The event detection system then identifies clusters of query-page pairs that are semantically and temporally similar.

15 Claims, 10 Drawing Sheets

OTHER PUBLICATIONS

Fonseca, Carlos M. and Peter J. Fleming, "Multiobjective Optimization and Multiple Constraint Handling with Evolutionary Algorithms I: A Unified Formulation," Jan. 23, 1995, IEEE TSMC, 40 pages.

Gibson, David, Jon Kleinberg and Prabhakar Raghavan, "Inferring Web Communities from Link Topology," HyperText 98, Pittsburgh, PA, © 1998 ACM, pp. 225-234.

Hopcroft, John et al., "Natural Communities in Large Linked Networks," SIGKDD '03, Aug. 2003, Washington, DC, © 2003 ACM, 6 pages.

Ino, Hidehiko, Mineichi Kudo and Atsuyoshi Nakamura, "Partitioning of Web Graphs by Community Topology," WWW May 2005, Chiba, Japan, ACM, pp. 661-669.

Jeh, Glen and Jennifer Widom, "SimRank: A Measure of Structural-Context Similarity," SIGKDD, 2002, pp. 1-11.

Joachims, Thorsten, "Making Large-Scale SVM Learning Practical," Jul. 9, 1998, pp. 41-56.

Joachims, Thorsten, "Optimizing Search Engines using Clickthrough Data," SIGKDD 2002, Alberta, Canada, © 2002 ACM, 10 pages.

Joachims, Thorsten, "SVMlight Support Vector Machine," Jul. 20, 2004, 10 pages, http://www.cs.cornell.edu/People/tj/svm_light/, [last accessed Feb. 20, 2006].

Kautz, Henry, Bert Selman and Mehul Shah, "ReferralWeb: Combining Social Networks and Collaborative Filtering," Communications of the ACM, vol. 40, No. 3, Mar. 1997, pp. 1-4.

Keogh, Eamonn, "Exact Indexing of Dynamic Time Warping," In VLDB 2002, Hong Kong, 12 pages.

Kleinberg, Jon M., "Hubs, Authorities, and Communities," ACM Computing Surveys, vol. 31 (4), Dec. 1999, © 1999 by the Association for Computing Machinery, Inc., 4 pages.

Kumar, Ravi et al., "The Web and Social Networks," Computer, Nov. 2002, © 2002 IEEE, pp. 32-36.

Kumar, Ravi et al., "Trawling the web for emerging cyber-communities," 1999, 21 pages.

Li, Wen-Syan et al., "Retrieving and Organizing Web Pages by 'Information Unit'," WWW May 2001, Hong Kong, ACM, pp. 230-244.

Li, Xiaoyan and W. Bruce Croft, "Novelty Detection Based on Sentence Level Patterns," CIKM'05, Oct. 2005, Germany, © 2005 ACM, 8 pages.

Nie, Zaiqing et al., "Object-Level Ranking: Bringing Order to Web Objects," WWW, May 2005, Japan, ACM, pp. 567-574.

Popescul, Alexandrin et al., "Clustering and Identifying Temporal Trends in Document Databases," IEEE Advances in Digital Libraries, ADL 2000, Washington, DC, May 22-24, 2000, pp. 173-182.

Reddy, P. Krishna and Masaru Kitsuregawa, "An approach to build a cyber-community hierarchy," WISE, 2001, pp. 1-12.

Reddy, P. Krishna and Masaru Kitsuregawa, "An approach to relate the web communities through bipartite graphs," WISE 2001, pp. 1-10.

Schwartz, Michael F. and David C. M. Wood, "Discovering Shared Interests Among People Using Graph Analysis of Global Electronic Mail Traffic," Oct. 1992, Communications of the Association for Computing Machinery, 15 pages.

Shi, Jianbo and Jitendra Malik, "Normalized Cuts and Image Segmentation," Nov. 16, 1999, IEEE Transactions on Pattern Analysis and Machine Intelligence, vol. 22, No. 8, Aug. 2000, © 2000 IEEE, pp. 888-905.

Soundararajan, Padmanabhan and Sudeep Sarkar, "Investigation of Measures for Grouping by Graph Partitioning," In CPR 2001, © 2001 IEEE, pp. 1239-1246.

Sun, Aixin and Ee-Peng Lim, "Web Unit Mining: Finding and Classifying Subgraphs of Web Pages," In CIKM 2003, New Orleans, © 2003 ACM, 8 pages.

Sun, Jian-Tao et al., "CubeSVD: A Novel Approach to Personalized Web Search," WWW, May 2005, Chiba, Japan, ACM, 9 pages.

Sun, Zhen et al., "Event-Driven Document Selection for Terrorism Information Extraction," ISI 2005, pp. 1-12.

Toyoda, Masashi and Masaru Kitsuregawa, "Extracting Evolution of Web Communities from a Series of Web Archives," HT'03, Aug. 2003, United Kingdom, © 2003 ACM, 10 pages.

Wen, Ji-Rong, Jian-Yun Nie and Hong-Jiang Zhang, "Clustering User Queries of a Search Engine," WWW, May 2001, Hong Kong, ACM, pp. 162-168.

Xue, Gui-Rong et al., "IRC: An Iterative Reinforcement Categorization Algorithm for Interrelated Web Objects," In ICDM 2004, 8 pages.

Xue, Gui-Rong et al., "Optimizing Web Search Using Web Clickthrough Data," CIKM, ACM, Nov. 2004, pp. 118-126.

Yang, Yiming et al., "Topic-conditioned Novelty Detection," In SIGKDD'02, Alberta, © 2002 ACM, pp. 688-693.

Zhang, Jian, Zoubin Ghahramani, and Yiming Yang, "A Probabilistic Model for Online Document Clustering with Application to Novelty Detection," In NIPS 17, 2005, 8 pages.

Zhou, Wen-Jun et al., "A Concentric-Circle Model for Community Mining in Graph Structures," Nov. 15, 2002, Microsoft Technical Report MSR-TR-2002-123, 8 pages.

* cited by examiner

EVENT DETECTION BASED ON EVOLUTION OF CLICK-THROUGH DATA

BACKGROUND

Many attempts have been made to extract knowledge from web pages. These attempts have been motivated, in part, by the breadth of information covered by web pages. In particular, a vast amount of information covering a wide range of objects and events is provided by web pages. The attempts to extract knowledge from web pages can be classified as either structure-based extraction or content-based extraction. Structure-based extraction attempts to identify sets of web pages corresponding to objects and events based on web site structure (e.g., hierarchy of web pages) and a hyperlink structure (e.g., linked-to web pages). Content-based extraction attempts to identify information corresponding to objects and events by segmenting and categorizing content of web pages into groups using various techniques such as natural language processing and probability models.

Many search engine services, such as Google and Overture, provide for searching for information that is accessible via the Internet and collect a vast amount of information related to searching by users. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. The search engine services identify related web pages based on how similar the keywords of the web pages are to the search terms of the query. The search engine services may generate a relevance score to indicate how relevant the information of the web page may be to the search request based on similarity of keywords, on web page importance or popularity, and so on. The search engine services then display to the user links to those web pages in an order that is based on a ranking determined by their relevance.

The search engine services collect information that includes click-through data. Query-based click-through data represents user selection of a link to a page from a search result for a query. For example, if a user submits the query "911," a search engine service may provide a web page of the search result that includes links to web pages relating to the 9-11 Commission, to the movie named Fahrenheit 9/11, and to the 911 emergency infrastructure. When a user submits the query, the search engine service may log an indication that the user submitted the query "911." When the user then selects a link from the search result, the search engine service may log an indication that the user selected that link (i.e., a click-through event). The search engine service can then analyze the log to match the selection of links to queries (e.g., via session identifier or IP addresses) and store click-through data that includes query-page pairs along with a time (e.g., click-through time). For example, a query-page pair may have the query "911" and the URL to the official web page of the movie Fahrenheit 9/11 with a time of Jul. 3, 2004 at 12:00:00 hours.

The events of web information relating to the events can be useful in various applications. For example, current web page classification hierarchies are typically based on a subject matter taxonomy. In certain circumstances, it may be useful to have classifications that explicitly correspond to events. For example, it may be useful to have a classification of "release" for pages relating to the release of a movie. Although structure-based extraction and content-based extraction have met with some success in certain applications, such as organizing a web site structure, restructuring search results, terrorism event detection, and so on, these extraction techniques have not been able to effectively detect the relationships between web pages and events that occur over time.

SUMMARY

A method and system for detecting events based on query-page relationships is provided. The event detection system detects events by analyzing occurrences of query-page pairs generated from a user selecting the page of the pair from a search result for the query of the pair. The event detection system may identify semantic and temporal similarity between query-page pairs. The event detection system then identifies clusters of query-page pairs that are semantically and temporally similar. Each identified cluster may represent an event that prompted users to submit the queries and select the pages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for detecting events based on query-page relationships is provided. In one embodiment, the event detection system detects events by analyzing occurrences of query-page pairs generated from a user selecting the page of the pair from a search result for the query of the pair. For example, a user may have submitted the query to a search engine service and selected a link to the page from the search result provided by the search engine service. The event detection system may identify query-page pairs that are semantically similar and that are in temporal proximity. For example, the query-page pairs "911—official web page of Fahrenheit 9/11" and "911—official web page of the 9-11 Commission" may be semantically related. The query-page pairs relating to Fahrenheit 9/11 may be temporally clustered around June 2004, which corresponds to the release of the movie. In contrast, the query-page pairs relating to the 9-11 Commission may be temporally clustered around September 2004, which corresponds to the third anniversary of the terrorist attack. In such a case, the event detection system detects that the semantically related query-page pairs clustered around June 2004 correspond to one event and those clustered around September 2004 correspond to another event. In this way, the event detection system identifies events based on analysis of query-page relationships (e.g., click-through data) and, in one embodiment, identifies the events based on both semantic similarity and temporal similarity of the query-page relationships.

In one embodiment, the event detection system generates a dual graph that represents distinct query-page pairs as vertices. A "distinct" query-page pair is a unique query and page combination that may have many occurrences in the query-page pair data. For example, the query-page pair of "911—official web page of Fahrenheit 9/11" may have thousands of occurrences in the query-page pair data that correspond to one distinct query-page pair. The query-page pair of "911—official web page of the 9-11 Commission" may also have thousands of occurrences in the query-page pair data, but all these occurrences correspond to a different and distinct query-page pair. For each of these distinct query-page pairs, the event detection system adds a vertex to the dual graph. The event detection system adds edges to the dual graph between each pair of vertices that have the same query or the same page of the query-page pair represented by the vertex. For example, the vertex corresponding to the query-page pair of "911—official web page of Fahrenheit 9/11" and the vertex corresponding to the query-page pair of "911—official web page of the 9-11 Commission" would be connected by an edge since both vertices correspond to the same query of "911." Similarly, the vertex corresponding to the query-page pair of "911—official web page of Fahrenheit 9/11" and the vertex corresponding to the query-page pair of "Fahrenheit movie—official web page of Fahrenheit 9/11" would be connected by an edge since both vertices correspond to the same page of "official web page of Fahrenheit 9/11." However, the vertex corresponding to the query-page pair of "911—official web page of the 9-11 Commission" and the vertex corresponding to the query-page pair of "Fahrenheit movie—official web page of Fahrenheit 9/11" would not be connected by an edge since both queries and pages are different. The event detection system uses the dual graph to identify clusters of query-page pairs that are semantically related.

In one embodiment, the event detection system identifies clusters of semantically related query-page pairs using the dual graph. The event detection system may identify the clusters based on semantic similarity between pairs of vertices of the dual graph. The event detection system may define semantic similarity of a pair of vertices, a first vertex and a second vertex, based on similarity between the neighbors of the first vertex and the neighbors of the second vertex. (Vertices that are connected by an edge are neighbors.) Conceptually, if the first vertex has many neighbor vertices that are very semantically similar to the neighbor vertices of the second vertex, then the first and second vertices are also very semantically similar. The event detection system may represent semantic similarity by the following equation:

$$S^S(a,b) = \frac{C}{|N(a)||N(b)|} \sum_{i=1}^{|N(a)|} \sum_{j=1}^{|N(b)|} S^S(N_i(a), N_j(b)) \quad (1)$$

where $S^S(a,b)$ represents the semantic similarity between vertex a and vertex b, N(k) represents the neighboring vertices of vertex k, $N_i(k)$ represents the $i^{th}$ neighbor vertex of vertex k, and C represents a decay factor between 0 and 1 that indicates the contribution of the neighbors to the similarity of a pair of vertices. In one embodiment, the event detection system solves for the semantic similarity by iteratively calculating the semantic similarity for a pair of vertices at one iteration based on the semantic similarity of neighboring vertices as calculated during the prior iteration. The event detection system performs the iterations until the semantic similarities converge on a solution.

In one embodiment, the event detection system identifies semantic clusters of query-page pairs or vertices from the dual graph based on the semantic similarity. The event detection system may use any of a variety of well-known clustering techniques to identify the clusters. The event detection system may identify clusters of vertices using a minimum cut technique in which the semantic similarities between vertices in the clusters and vertices outside the clusters are minimized. The event detection system may represent the goal of the minimum cut technique with an objective function that is to be minimized. The event detection system may use a normalized cut objective function as described in Shi, J. and Malik, J., "Normalized Cuts and Image Segmentation," IEEE Transactions on Pattern Analysis and Machine Intelligence, Vol. 22, No. 8, August 2000, which is hereby incorporated by reference. A normalized cut objective function is based on a disassociation measure that indicates that the cut cost is a fraction of the total edge connections to all the vertices in the graph and based on a normalized association measure within a cluster that indicates how tightly the vertices of a cluster are connected. The event detection system may use a recursive 2-way cut algorithm that recursively partitions each cluster, starting with the entire graph, into two clusters until a termination criterion is met. Each cluster represents a detected event. A person may review the query-page pairs of a cluster to identify the underlying event (e.g., release of a movie or anniversary of a terrorist attack).

In one embodiment, the event detection system also factors in the evolution of query-page pairs that occurs over time when identifying clusters. To represent the evolution, the event detection system associates with each vertex of the dual graph a time period vector. The event detection system may divide the query-page pairs into time periods based on into which time periods their times fall. For example, the event detection system may define a time period to be a month. If the query-page pair data covers a year, then a time period vector would have 12 elements—one for each month. The event detection system sets an element of a time period vector to a value indicating the strength of the correlation between the query and the page represented by a vertex. The strength of the correlation for a time period may be based on the number of occurrences of that query-page pair within the time period, which may be normalized based on the total number of occurrences of that query-page pair within all time periods. For example, the vertex corresponding to the query-page pair of "911—official web page of Fahrenheit 9/11" may have time period vector of [0, 0, 0, 0, 0.003, 0.01, 0.015, 0.01, 0.005, 0.001, 0, 0] for the year 2004. As this vector indicates, the strength for the correlation for this query-page pair increased in the months of June, July, and August around the release of the movie.

In one embodiment, the event detection system may identify clusters based on time or evolution pattern similarity between pairs of vertices of the dual graph. The event detection system may calculate time pattern similarity based on analysis of the time period vectors of the vertices. The event detection system may use a dynamic time warping as described in Keogh, E., "Exact Indexing of Dynamic Time Warping," VLDB, pp. 406-417, 2002, which is hereby incorporated by reference, to determine time pattern similarity. To determine the similarity, the event detection system generates a matrix that contains the difference (e.g., Euclidean difference) between each pair of elements of a pair of time period vectors. The event detection system then uses a dynamic time warping algorithm to identify a path through time that minimizes the differences. The path through time starts at the matrix element (0,0) and ends at the matrix element (n,n), where n is the number of time periods. The event detection system bases the time pattern similarity on the distances of the identified path.

After identifying the time pattern similarities, the event detection system identifies the time pattern clusters of vertices with similar time pattern similarities. The event detection system may identify clusters using a minimum cut technique as described above. In one embodiment, the event detection system may first identify the semantic clusters and then, for each semantic cluster, identify the time pattern clusters within that semantic cluster. The time pattern clusters thus represent clustering based on both semantic similarity and temporal similarity.

In one embodiment, the event detection system may use a histogram representation of the time period vectors when there are many time periods. If there are many time periods, then the computational complexity of calculating the time pattern similarity using dynamic time warping techniques may be very high. In such a case, the event detection system may group multiple adjacent time periods into a single aggregated time period. For example, if the query-page pair data covers a year and the time period is one day, then the event detection system may aggregate each two week period of data into a single aggregate strength value. The aggregated time period vector would have 26 elements rather than 365 elements. The event detection system may aggregate the strengths associated with each time period within an aggregate time period by adding them together.

In one embodiment, the event detection system may use time period bipartite graphs and a time period vector bipartite graph to generate the dual graph augmented with the time period vectors. The event detection system generates a time period bipartite graph for each time period based on the query-page pairs with times within that time period. The event detection system adds to the time period bipartite graph a query vertex for each distinct query of a query-page pair within the time period and a page vertex for each distinct page of a query-page pair within the time period. The event detection system then adds an edge to the graph for each distinct query-page pair within that time period. For example, if the time period contains a query-page pair of "911—official web page of Fahrenheit 9/11," then the event detection system will add a query vertex for the query "911" and a page vertex for the page of "official web page of Fahrenheit 9/11." The event detection system also adds an edge connecting those vertices.

The edge detection system represents the strength of the correlation between a query vertex and a page vertex based on the following equation:

$$s_i(P_{s,t}) = \frac{|P_{s,i}(c_i)|}{\sum_{j=1}^{n} |P_{s,i}(c_j)|} \quad (2)$$

where $P_{s,t}$ represents the query-page pair for query s and page t, $s_i(P_{s,t})$ represents the strength of the correlation between query s and page t during time period i, $P_{s,t}(c_k)$ represents the count of the occurrences of $P_{s,t}$ in time period k, and n is the number of time periods.

In one embodiment, the event detection system generates a time period vector bipartite graph from the time period bipartite graphs. The time period vector bipartite graph includes a query vertex for each distinct query vertex of a time period bipartite graph and a page vertex for each distinct page vertex of a time period bipartite graph. The event detection system adds an edge between each query vertex and page vertex that has at least one corresponding edge in a time period bipartite graph. The event detection system then associates a time period vector with each edge of the time period vector bipartite graph. As described above, a time period vector contains an element for each time period that indicates the strength of the correlation between the connected query vector and page vector. The event detection system generates a dual graph from the time period vector bipartite graph by adding a vertex to the dual graph for each edge of the time period vector bipartite graph, adding the time period vectors as an attribute of the corresponding vertices, and adding edges between vertices corresponding to the same query or same page.

Figure 1:
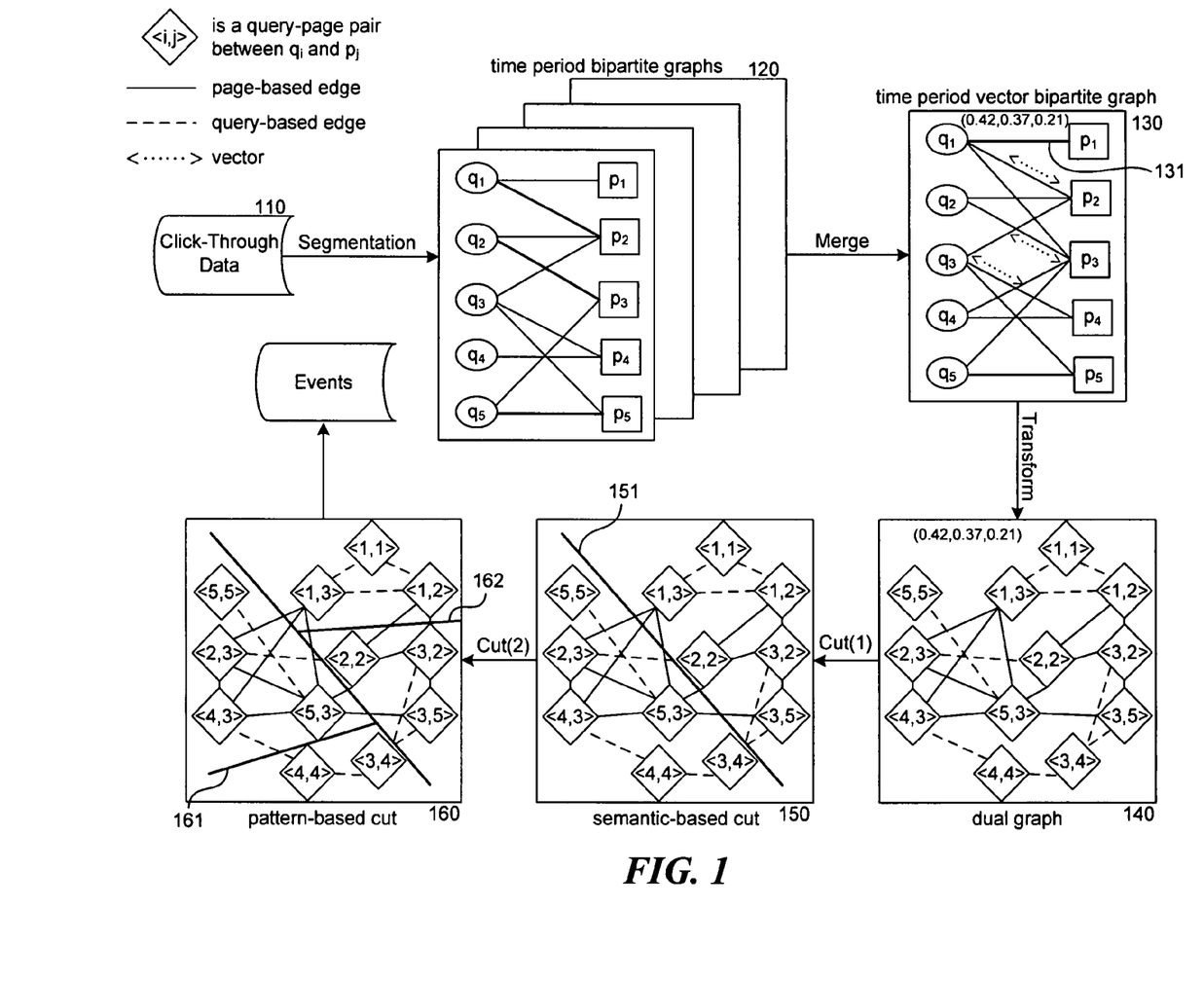
FIG. 1 is a block diagram that illustrates the overall process of detecting events by the event detection system in one embodiment.

FIG. 1 is a block diagram that illustrates the overall process of detecting events by the event detection system in one embodiment. The event detection system inputs click-through data 110 that includes query-page pairs, each with an associated time. The event detection system then generates the time period bipartite graphs 120. In this example, the time period bipartite graph for the first time period includes query vertices for queries q1-q5 and page vertices for pages p1-p5. The query-page pairs include the pairs q1-p1 and q1-p2 as indicated by the edges, but do not include the pair q1-p3 as indicated by a lack of an edge. Each edge of a time period bipartite graph includes a strength value that indicates the correlation between the query and the page relative to that time period. The event detection system then generates the time period vector bipartite graph 130. The time period vector bipartite graph includes a query vertex for each query represented by a time period bipartite graph and a page vertex for each page represented by a time period bipartite graph. Each edge has an associated time period vector such as vector 131. The event detection system then generates the dual graph 140 from the time period vector bipartite graph. The dual graph includes a vertex corresponding to each edge of the time period vector bipartite graph. For example, the dual graph includes the vertex labeled <2,3> which corresponds to the edge between the query vertex for q2 and the page vertex for p3 in the time period vector bipartite graph. The dual graph also includes an edge connecting vertices that correspond to the same query or page. For example, the vertices labeled <5,5> and <5,3> are connected by an edge because both vertices correspond to query q5. Also, the vertices labeled <1,3> and <5,3> are connected by an edge because both vertices correspond to page p3. The event detection system associates with each vertex the time period vector that was associated with the corresponding edge of the time period vector bipartite graph. For example, the vertex labeled <1,1> has the time period vector 131 associated with it. The event detection system then identifies semantic clusters as indicated by the dual graph with semantic cut 150. The vertices of the dual graph are clustered based on the minimum cut 151 based on semantic similarity as described above. The event detection system then further clusters each semantic cluster into a time pattern cluster based on time pattern similarity. In this example, the event detection system divides one semantic cluster based on minimum cut 161 and the other semantic cluster based on minimum cut 162. Each of the time pattern clusters represents an event.

Figure 2:
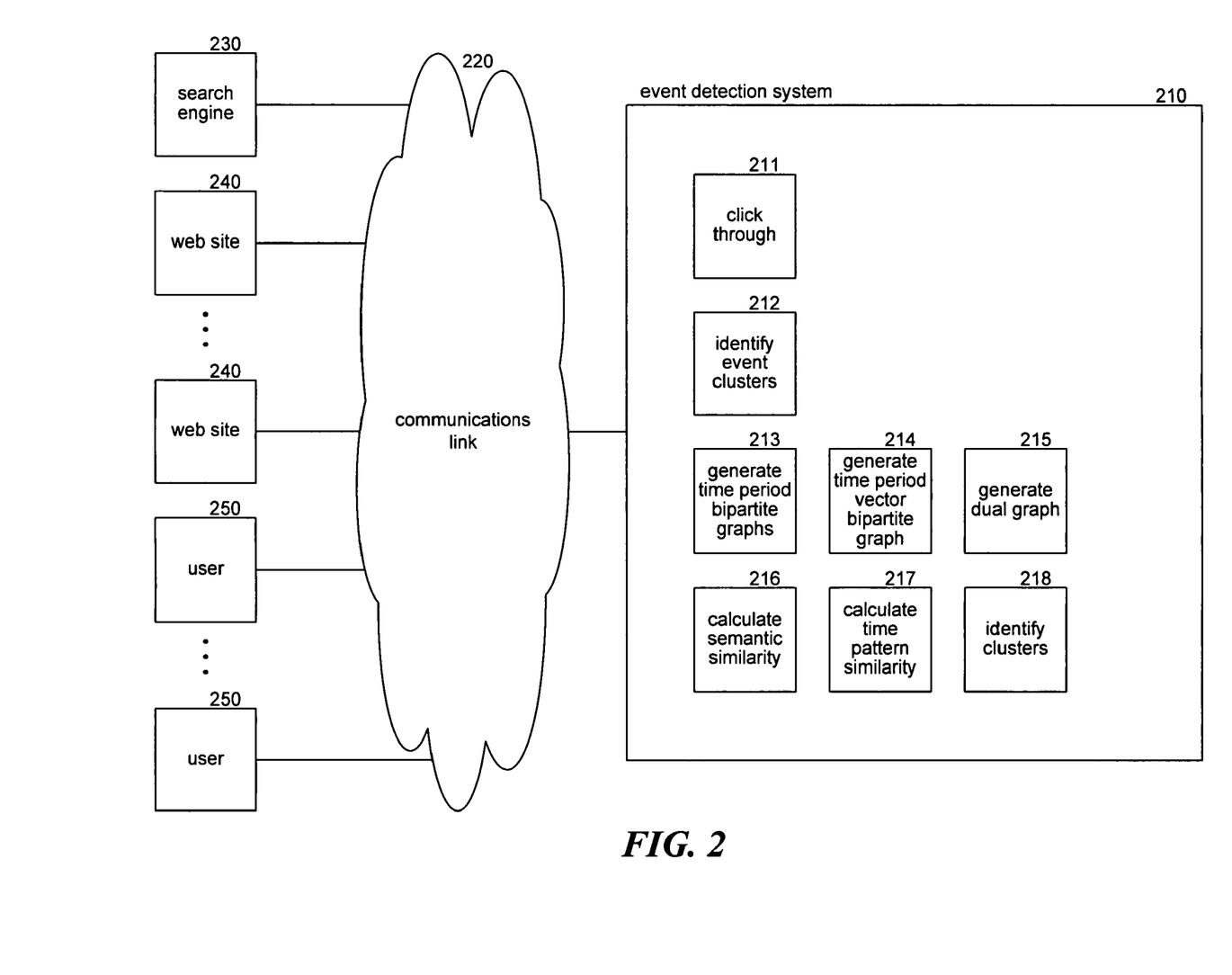
FIG. 2 is a block diagram that illustrates components of the event detection system in one embodiment.

FIG. 2 is a block diagram that illustrates components of the event detection system in one embodiment. The event detection system 210 is connected via communications link 220 to search engine 230, web sites 240, and user computers 250. The event detection system includes a click-through data store 211 that contains click-through data that may be collected by the search engine. The search engine may collect the click-through data based on user-submitted queries and subsequent click-throughs to the web sites. The event detection system includes an identify event clusters component 212 that controls the identification of clusters. The identify event clusters component invokes a generate time period bipartite graphs component 213, a generate time period vector bipartite graph component 214, a generate dual graph component 215, a calculate semantic similarity component 216, a calculate time pattern similarity component 217, and an identify clusters component 218. The generate graph components generate the graphs as described above. The calculate semantic similarity component calculates the semantic similarity based on the dual graph. The calculate time pattern similarity component calculates the time pattern similarity based on the dual graph augmented with time period vectors. The identify clusters component identifies clusters of vertices using either semantic similarity or time pattern similarity or both based on a normalized cut objective function.

The computing devices on which the event detection system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the event detection system. In addition, the data structures and message structures may be transmitted via a data transmission medium, such as a signal on a communications link. Various communications links may be used, such as the Internet, a local area network, a wide area network, or a point-to-point dial-up connection to connect the clustering system to other devices (e.g., web servers).

The event detection system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The event detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
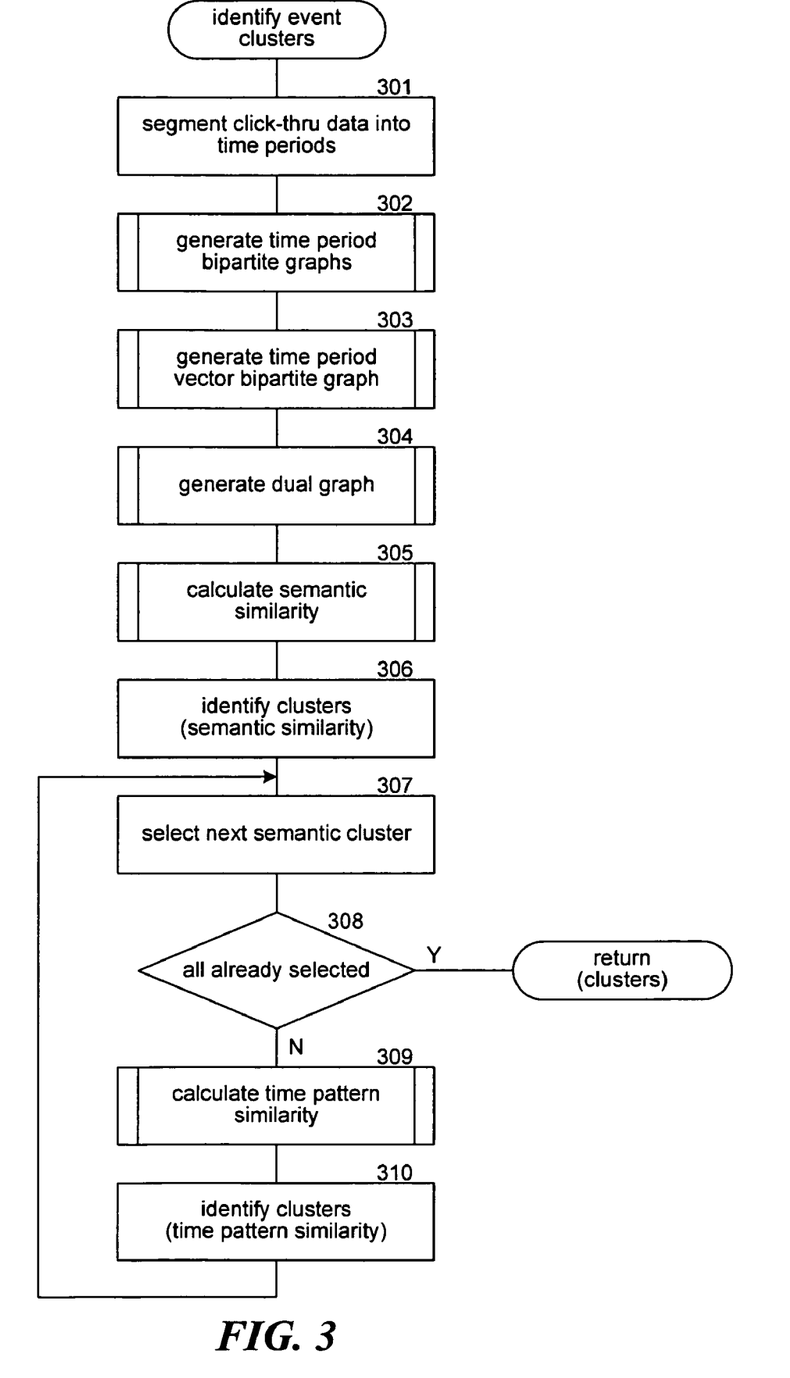
FIG. 3 is a flow diagram that illustrates the processing of the identify event clusters component of the event detection system in one embodiment.

FIG. 3 is a flow diagram that illustrates the processing of the identify event clusters component of the event detection system in one embodiment. The component inputs click-through data and identifies clusters of query-page pairs that correspond to events. In block 301, the component segments the click-through data into time periods. In block 302, the component invokes the generate time period bipartite graphs component to generate a time period bipartite graph for each time period. In block 303, the component invokes the generate time period vector bipartite graph component to generate the time period vector bipartite graph based on the time period bipartite graphs. In block 304, the component invokes the generate dual graph component to generate the dual graph with time period vectors based on the time period vector bipartite graph. In block 305, the component invokes the calculate semantic similarity component to calculate the semantic similarity between each pair of vertices in the dual graph. In block 306, the component identifies the clusters within the dual graph based on semantic similarity. In blocks 307-310, the component loops identifying clusters within each semantic cluster based on time pattern similarity. In block 307, the component selects the next semantic cluster. In decision block 308, if all the semantic clusters have already been selected, then the component returns the time pattern clusters, else the component continues at block 309. In block 309, the component invokes the time pattern similarity component to calculate the time pattern similarities between pairs of vertices. In block 310, the component identifies the clusters of the selected semantic segment based on time pattern similarity. The component then loops to block 307 to select the next semantic cluster.

Figure 4:
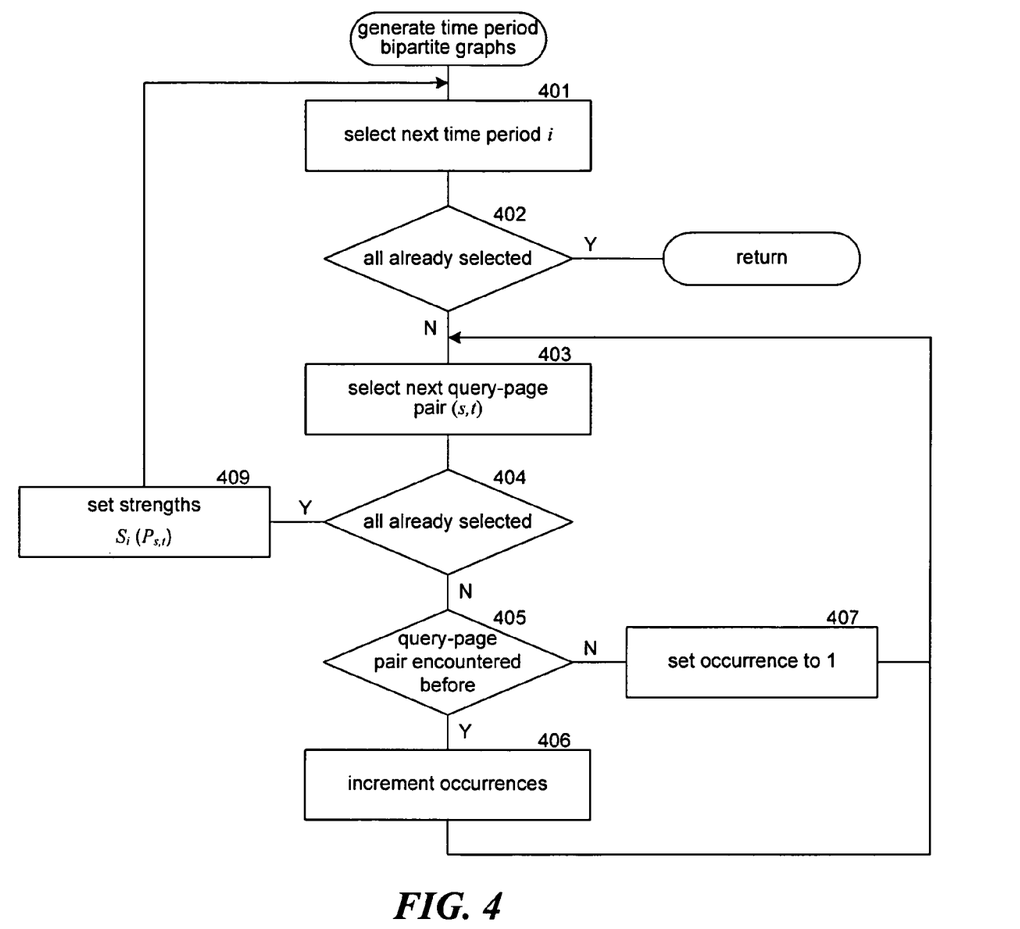
FIG. 4 is a flow diagram that illustrates the processing of the generate time period bipartite graphs component of the event detection system in one embodiment.

FIG. 4 is a flow diagram that illustrates the processing of the generate time period bipartite graphs component of the event detection system in one embodiment. The component loops generating a bipartite graph for each time period. In block 401, the component selects the next time period i. In decision block 402, if all the time periods have already been selected, then the component returns, else the component continues at block 403. In block 403, the component selects the next occurrence of a query-page pair s,t in the click-through data. In decision block 404, if all the query-page pairs s,t have already been selected for the selected time period i, then the component continues at block 409, else the component continues at block 405. In decision block 405, if the selected query-page pair has been encountered before, then the component continues at block 406, else the component continues at block 407. In block 406, the component increments the occurrence count associated with the selected query-page pair s,t. In block 407, the component initializes the occurrence count for the selected query-page pair s,t. The component then loops to block 403 to select the next query-page pair s,t. In block 409, the component sets the strength associated with the selected query-page pair according to Equation 2. The component then loops to block 401 to select the next time period i.

Figure 5:
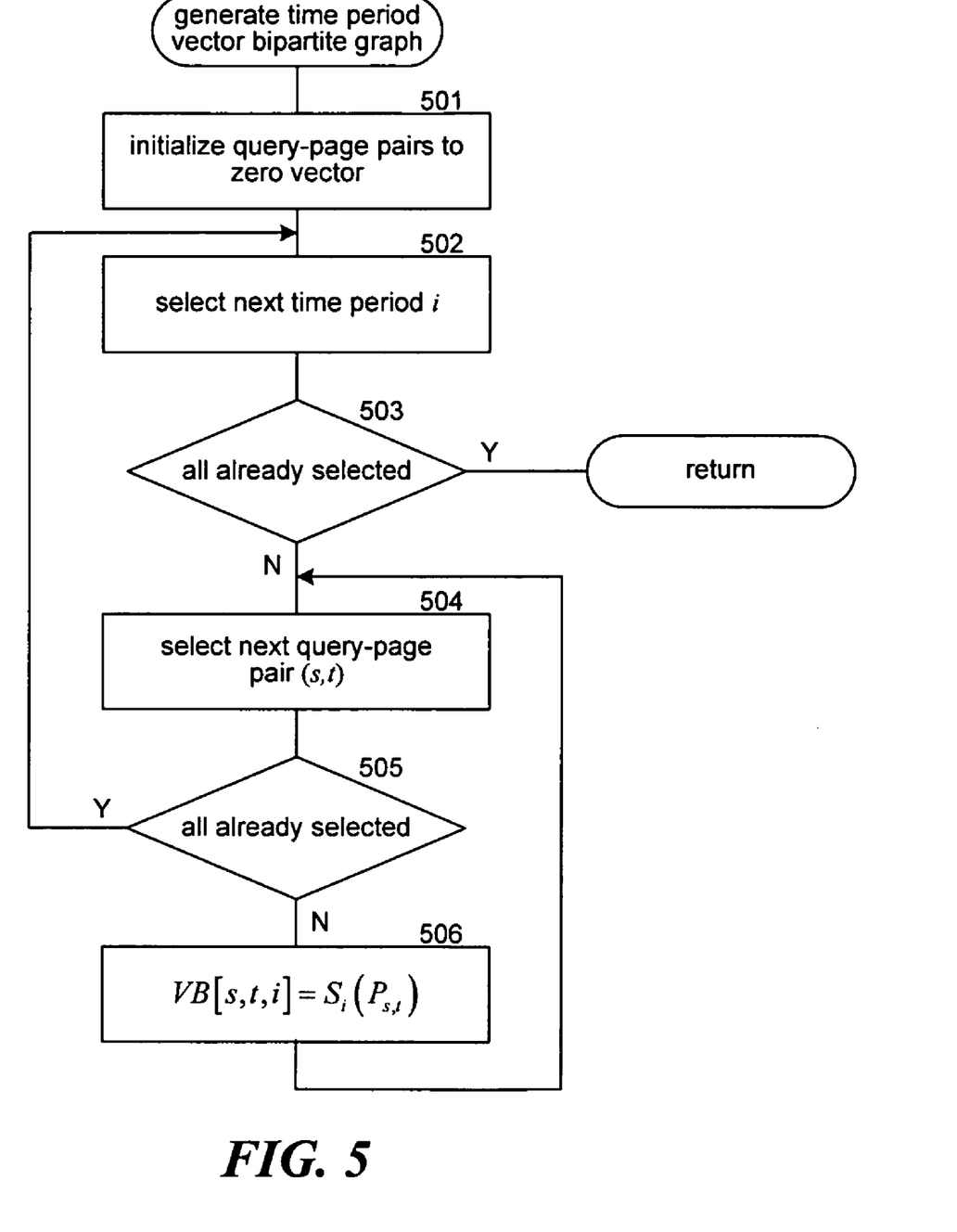
FIG. 5 is a flow diagram that illustrates the processing of the generate time period vector bipartite graph component of the event detection system in one embodiment.

FIG. 5 is a flow diagram that illustrates the processing of the generate time period vector bipartite graph component of the event detection system in one embodiment. In block 501, the component initializes a time period vector to zero for each distinct query-page pair of the time period bipartite graphs. In block 502, the component selects the next time period i. In decision block 503, if all the time periods have already been selected, then the component returns, else the component continues at block 504. In block 504, the component selects the next query-page pair s,t within the selected time period i. In decision block 505, if all the time periods i have already been selected, then the component loops to block 502 to select the next time period i, else the component continues at block 506. In block 506, the component sets the element of the time period vector for query-page pair s,t corresponding to the selected time period i to the strength indicated by the time period bipartite graph for the selected time period i. The component then loops to block 504 to select the next query-page pair.

Figure 6:
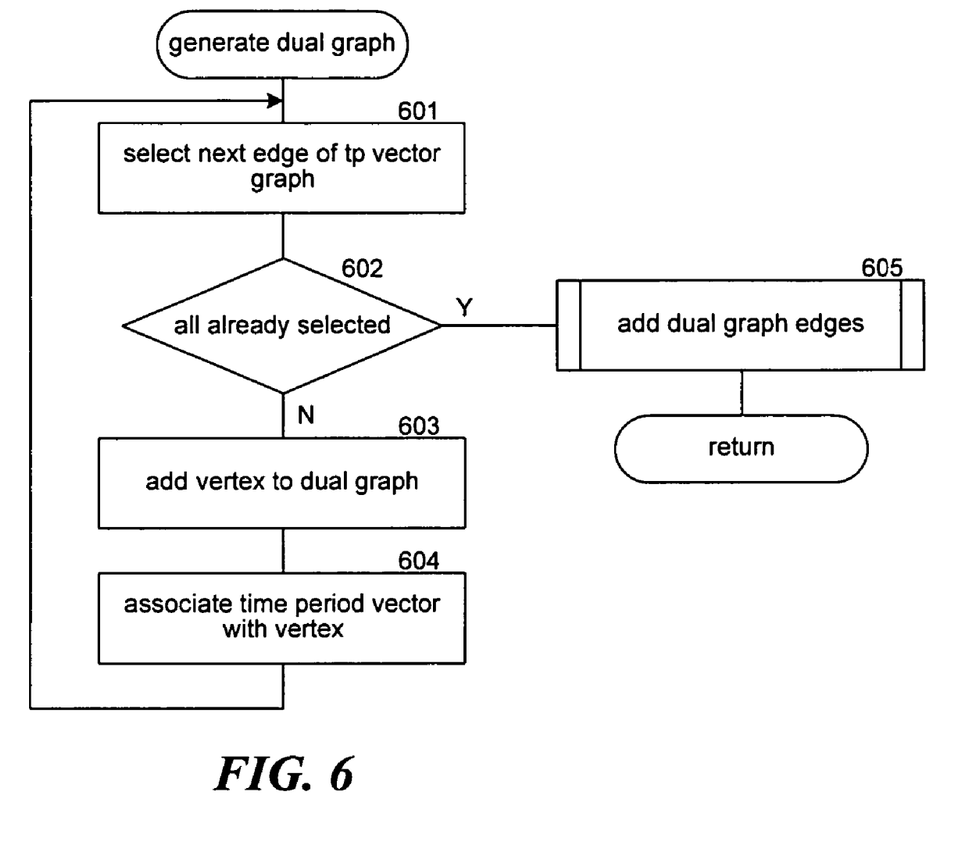
FIG. 6 is a flow diagram that illustrates the processing of the generate dual graph component of the event detection system in one embodiment.

FIG. 6 is a flow diagram that illustrates the processing of the generate dual graph component of the event detection system in one embodiment. The component loops selecting each edge of the time period vector bipartite graph and adding a corresponding vertex to the dual graph. In block 601, the component selects the next edge of the time period vector bipartite graph. In decision block 602, if all the edges have already been selected, then the component continues at block 605, else the component continues at block 603. In block 603, the component adds a vertex to the dual graph corresponding to the selected edge. In block 604, the component associates the time period vector of the selected edge with the added vertex. The component then loops to block 601 to select the next edge. In block 605, the component invokes the add dual graph edges component to add edges to the dual graph and then returns.

Figure 7:
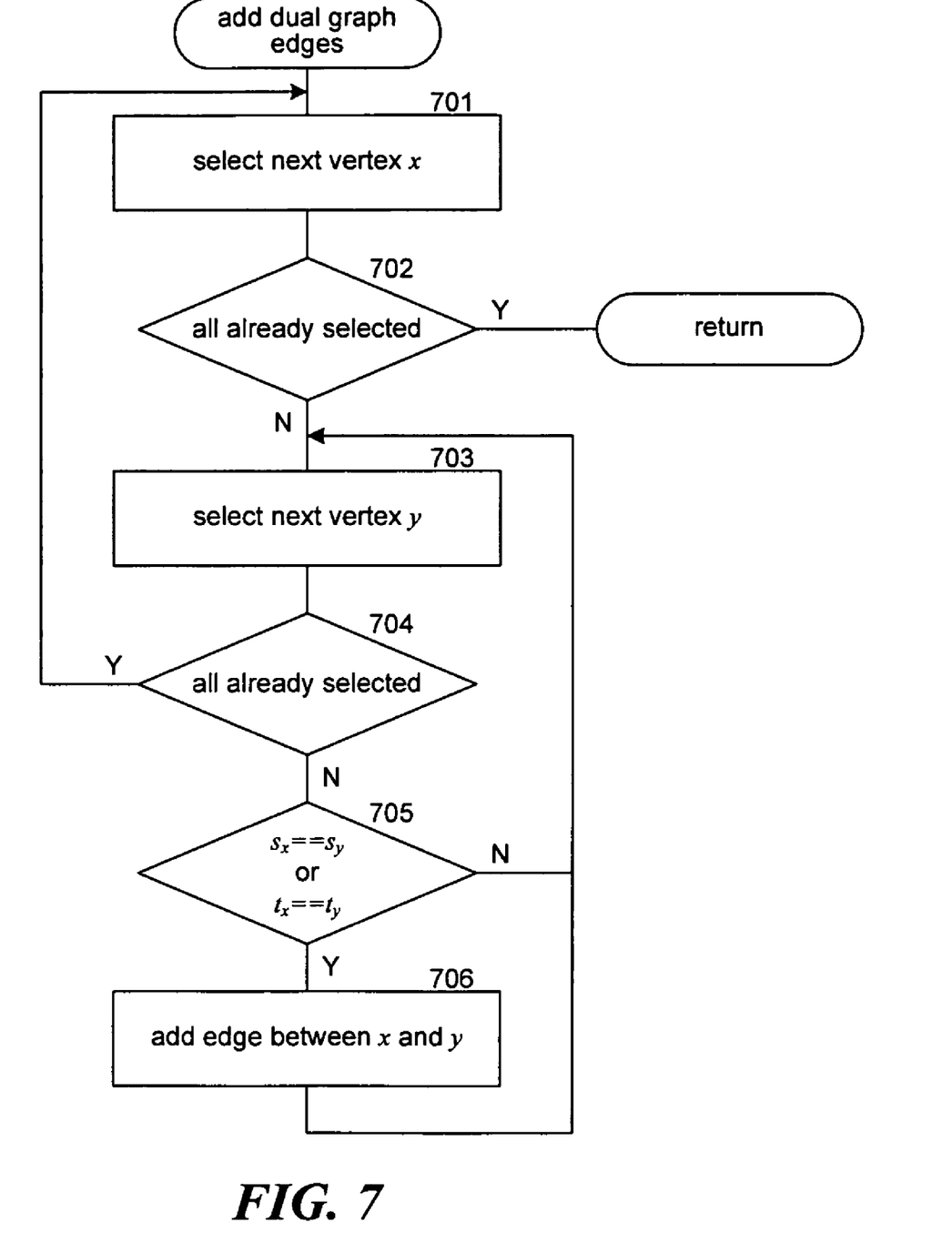
FIG. 7 is a flow diagram that illustrates the processing of the add dual graph edges component of the event detection system in one embodiment.

FIG. 7 is a flow diagram that illustrates the processing of the add dual graph edges component of the event detection system in one embodiment. In block 701, the component selects the next vertex x of the dual graph. In decision block 702, if all the vertices x have already been selected, then the component returns, else the component continues at block 703. In block 703, the component selects the next vertex y of the dual graph. In decision block 704, if all the vertices y have already been selected, then the component loops to block 701 to select the next vertex x, else the component continues at block 705. In decision block 705, if the selected x and y vertices have the same query or page, then the component continues at block 706, else the component loops to block 703 to select the next vertex y. In block 706, the component adds an edge between the x and y vertices and then loops to block 703 to select the next vertex y.

Figure 8:
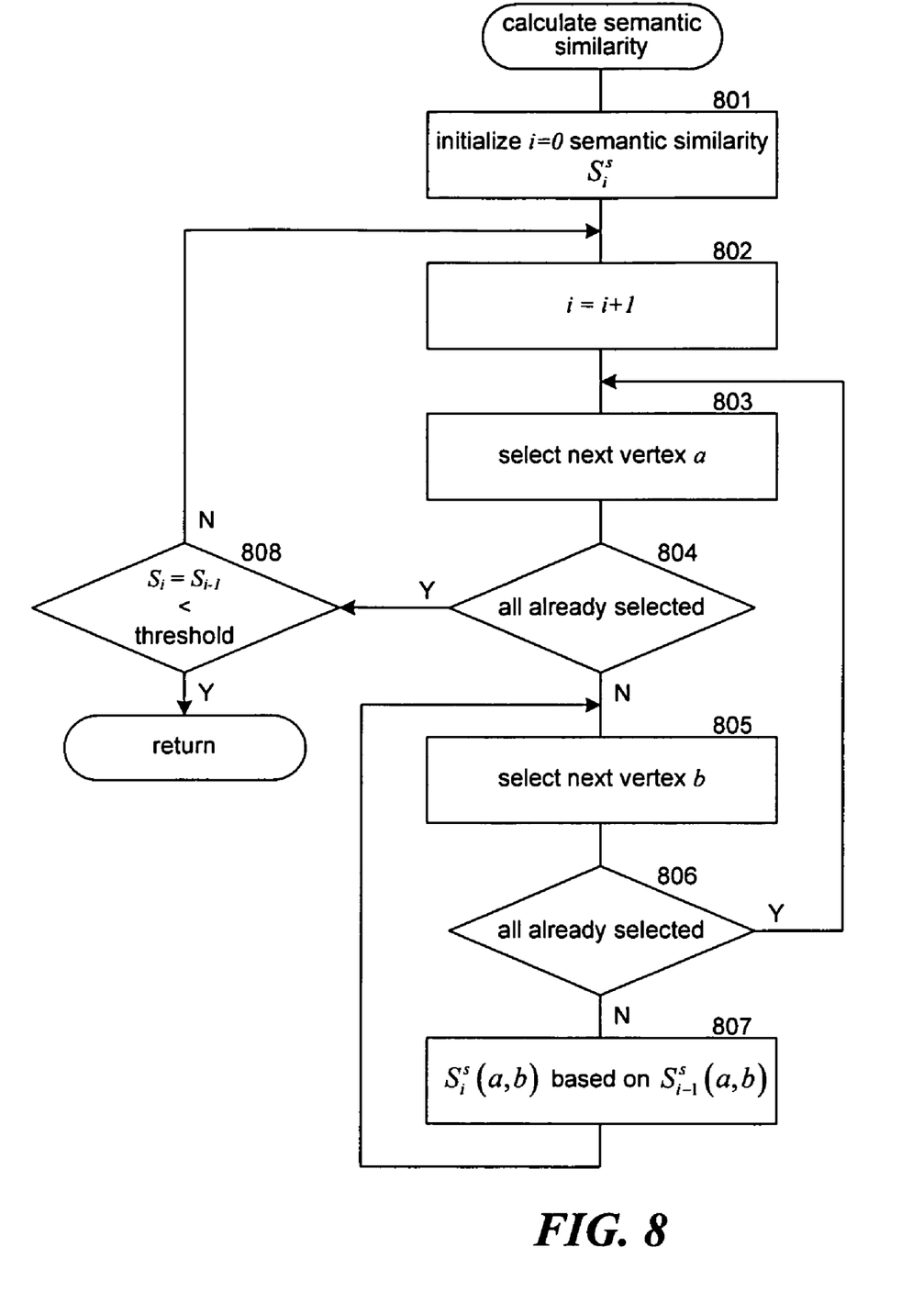
FIG. 8 is a flow diagram that illustrates the processing of the calculate semantic similarity component of the event detection system in one embodiment.

FIG. 8 is a flow diagram that illustrates the processing of the calculate semantic similarity component of the event detection system in one embodiment. The component calculates the semantic similarity for each pair of vertices in the dual graph. In block 801, the component initializes the semantic similarity for each pair of vertices. For example, the component may set the semantic similarity for each pair of vertices to 0.5. In block 802, the component increments i for the next iteration. In block 803, the component selects the next vertex a. In decision block 804, if all the vertices a have already been selected, then the component continues at block 808, else the component continues at block 805. In block 805, the component selects the next vertex b. In decision block 806, if all the vertices b for the selected vertex a have already been selected, then the component loops to block 803 to select the next vertex a, else the component continues at block 807. In block 807, the component calculates the semantic similarity for the selected vertices a and b based on the semantic similarities calculated during the previous iteration for their neighbor vertices according to Equation 1. The component then loops to block 805 to select the next vertex b. In decision block 808, if the difference between the semantic similarities for the pairs of vertices as calculated during this iteration and the previous iteration is less than a threshold, then the solution has converged and the component returns, else the component loops to block 802 to start the next iteration.

Figure 9:
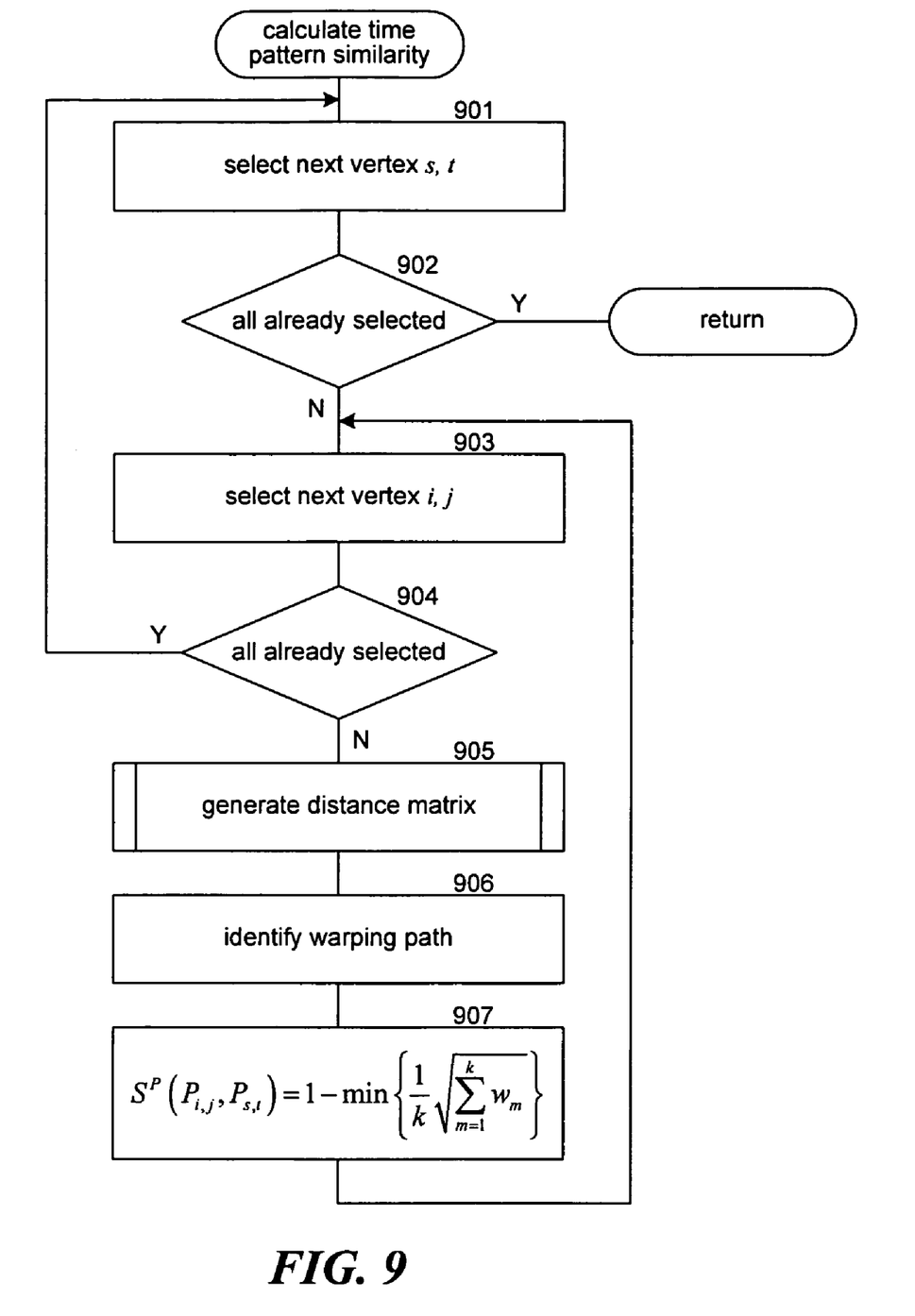
FIG. 9 is a flow diagram that illustrates the processing of the calculate time pattern similarity component of the event detection system in one embodiment.

FIG. 9 is a flow diagram that illustrates the processing of the calculate time pattern similarity component of the event detection system in one embodiment. In block 901, the component selects the next vertex s,t. In decision block 902, if all the vertices s,t have already been selected, then the component returns, else the component continues at block 903. In block 903, the component selects the next vertex i,j for the selected vertex s,t. In decision block 904, if all the vertices i,j have already been selected, then the component loops to block 901 to select the next vertex s,t, else the component continues at block 905. In block 905, the component invokes the generate distance matrix component to generate a matrix of the distances between the elements of the time period vectors for the selected vertices. In block 906, the component identifies the dynamic warping path within the distance matrix. In block 907, the component sets the time pattern similarity for the selected vertices based on the warping path. The component then loops to block 903 to select the next vertex i,j.

Figure 10:
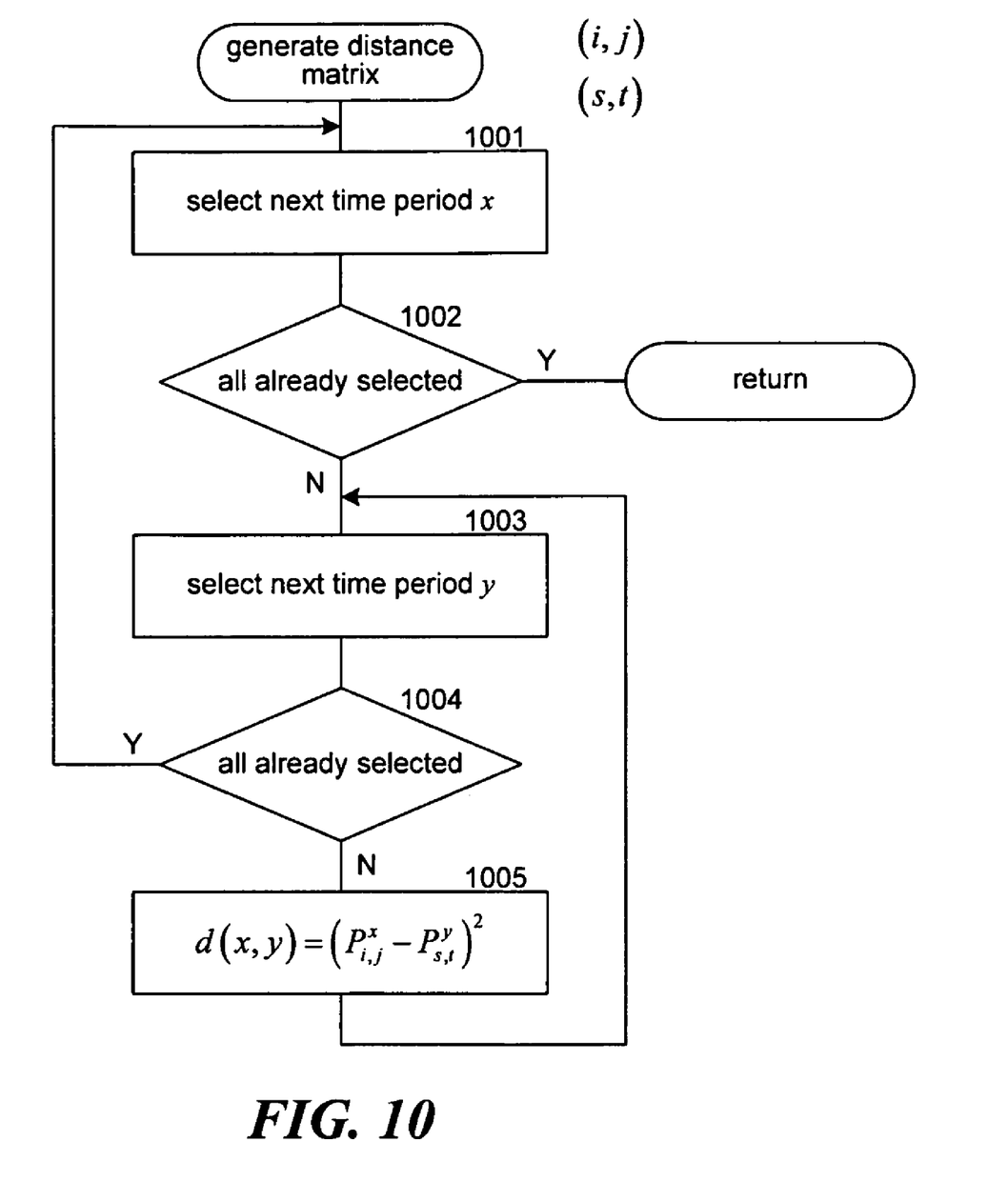
FIG. 10 is a flow diagram that illustrates the processing of the generate distance matrix component of the event detection system in one embodiment.

FIG. 10 is a flow diagram that illustrates the processing of the generate distance matrix component of the event detection system in one embodiment. The component is passed a pair of vertices of the dual graph and calculates the distance matrix between the elements of the time period vectors of the vertices. In block 1001, the component selects the next time period x. In decision block 1002, if all the time periods have already been selected, then the component returns, else the component continues at block 1003. In block 1003, the component selects the next time period y. In decision block 1004, if all the time periods y have already been selected, then the component loops to block 1001 to select the next time period x, else the component continues at block 1005. In block 1005, the component sets the distance between the elements of the time period vector for the selected time periods x and y. The component then loops to block 1003 to select the next time period y.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The bipartite graphs can be used to represent various types of heterogeneous data that change over time. For example, the heterogeneous data may include descriptions of problems submitted by user to a knowledge base and associated resolutions selected by users for further investigation. As another example, the principles of the event detection system may be used to identify events from query-page pairs without having to create some of or any of the time period bipartite graph, the time period vector bipartite graph, or the dual graph. Rather, the event detection system may during the clustering process analyze the click-through data directly. Accordingly, the invention is not limited except as by the appended claims.

We claim:

1. A computing device for detecting events based on query-page relationships, comprising:
a query-page store identifying occurrences of query-page pairs, each occurrence of a query-page pair indicating that a user selected that page from a search result for that query, each occurrence of a query-page pair having a time associated with the user selection;
a generate dual graph component that generates a dual graph having vertices corresponding to distinct query-page pairs of the query-page store and edges between vertices that have a common query or a common page, each vertex having a time period vector with an element for each time period, each element having a value derived from occurrences of the query-page pair of the vertex with a time within the time period;

an identify semantic cluster component that identifies clusters of vertices of the dual graph, each cluster having vertices whose query-page pairs are semantically similar; and an identify time pattern cluster component that identifies time pattern clusters of a semantic cluster, a time pattern cluster having vertices representing semantically related query-page pairs that have similar patterns of associated times, wherein an identified time pattern cluster represents an event relating to the query-page pairs of the vertices within the identified time pattern cluster, and wherein query-page pairs are semantically similar based on the following:

$$S^S(a, b) = \frac{C}{|N(a)||N(b)|} \sum_{i=1}^{|N(a)|} \sum_{j=1}^{|N(b)|} S^S(N_i(a), N_j(b))$$

where $S^s$ (a, b) represents the semantic similarity between vertex a and vertex b, N(k) represents the neighboring vertices of vertex k, $N_i(k)$ represents the $i^{th}$ neighbor vertex of vertex k, and C represents a decay factor between 0 and 1 that indicates the contribution of the neighbors to the similarity of a pair of vertices wherein the components are implemented as instructions stored in memory of the computing device for execution by a processor of the computing device.

2. The computing device of claim 1 including:

a generate time period bipartite graphs component that generates a time period graph for each time period; and a generate time period vector bipartite graph component that generates a time period vector graph from the generated time period bipartite graphs, wherein the generate dual graph component generates the dual graph from the time period vector bipartite graph.

3. The computing device of claim 2 including:

a generate time period bipartite graphs component that generates a time period graph for each time period, each time period graph having a query vertex for each distinct query of a query-page pair with a time within the time period and a page vertex for each distinct page of a query-page pair with a time within the time period and having an edge between a query vertex and a page vertex for each distinct query-page pair, each edge having an associated weight based on occurrences of that distinct query-page pair within the time period; and a generate time period vector bipartite graph component that generates a time period vector bipartite graph having a query vertex for each distinct query vertex in a time period bipartite graph and a page vertex for each distinct page vertex in a time period bipartite graph and having an edge for each edge between a distinct query vertex and page vertex in the time period bipartite graphs, each edge having a time period vector with an element for each time period, the elements based on the weight of the corresponding edge of the corresponding time period bipartite graph, wherein the generate dual graph component generates the dual graph from the time period vector bipartite graph and wherein each vertex of the dual graph has an associated time period vector.

4. The computing device of claim 1 wherein the semantic similarity between query-page pairs is based on similarity between neighbors of the query-page pairs.

5. The computing device of claim 1 wherein the time pattern similarity is based on similarity of access patterns of the query-page pairs over time.

6. A computer-readable storage medium containing computer-executable instructions for controlling a computing device to detect events based on query-page relationships, by a method comprising:

providing a query-page store identifying occurrences of query-page pairs, each occurrence of a query-page pair indicating that a user selected that page from a search result for that query, each occurrence of a query-page pair having a time associated with the user selection;

generating a dual graph having vertices corresponding to distinct query-page pairs of the query-page store and edges between vertices that have a common query or a common page, each vertex having a time period vector with an element for each time period, each element having a value derived from occurrences of the query-page pair of the vertex with a time within the time period;

identifying clusters of vertices of the dual graph, each cluster having vertices whose query-page pairs are semantically similar; and identifying time pattern clusters of a semantic cluster, a time pattern cluster having vertices representing semantically related query-page pairs that have similar patterns of associated times, wherein an identified time pattern cluster represents an event relating to the query-page pairs of the vertices within the identified time pattern cluster, and wherein query-page pairs are semantically similar based on the following:

$$S^S(a, b) = \frac{C}{|N(a)||N(b)|} \sum_{i=1}^{|N(a)|} \sum_{j=1}^{|N(b)|} S^S(N_i(a), N_j(b))$$

where $S^s$ (a, b) represents the semantic similarity between vertex a and vertex b, N(k) represents the neighboring vertices of vertex k, $N_i(k)$ represents the $i^{th}$ neighbor vertex of vertex k, and C represents a decay factor between 0 and 1 that indicates the contribution of the neighbors to the similarity of a pair of vertices.

7. The computer-readable storage medium of claim 6 including: generating a time period graph for each time period; and generating a time period vector graph from the generated time period bipartite graphs, wherein the dual graph is generated from the time period vector bipartite graph.

8. The computer-readable storage medium of claim 7 including:

generating a time period graph for each time period, each time period graph having a query vertex for each distinct query of a query-page pair with a time within the time period and a page vertex for each distinct page of a query-page pair with a time within the time period and having an edge between a query vertex and a page vertex for each distinct query-page pair, each edge having an associated weight based on occurrences of that distinct query-page pair within the time period; and generating a time period vector bipartite graph having a query vertex for each distinct query vertex in a time period bipartite graph and a page vertex for each distinct page vertex in a time period bipartite graph and having an edge for each edge between a distinct query vertex and page vertex in the time period bipartite graphs, each edge having a time period vector with an element for each time period, the elements based on the weight of the corresponding edge of the corresponding time period bipartite graph, wherein the dual graph is generated from the time period vector bipartite graph and wherein each vertex of the dual graph has an associated time period vector.

9. The computer-readable storage medium of claim 6 wherein the semantic similarity between query-page pairs is based on similarity between neighbors of the query page pairs.

10. The computer-readable storage medium of claim 6 wherein the time pattern similarity is based on similarity of access patterns of the query-page pairs over time.

11. A method performed by a computer system with a processor and a memory for detecting events based on query-page relationships, comprising:

providing a query-page store identifying occurrences of query-page pairs, each occurrence of a query-page pair indicating that a user selected that page from a search result for that query, each occurrence of a query-page pair having a time associated with the user selection;

generating by the computer system a dual graph having vertices corresponding to distinct query-page pairs of the query-page store and edges between vertices that have a common query or a common page, each vertex having a time period vector with an element for each time period, each element having a value derived from occurrences of the query-page pair of the vertex with a time within the time period;

identifying by the computer system clusters of vertices of the dual graph, each cluster having vertices whose query-page pairs are semantically similar; and identifying by the computer system time pattern clusters of a semantic cluster, a time pattern cluster having vertices representing semantically related query-page pairs that have similar patterns of associated times, wherein an identified time pattern cluster represents an event relating to the query-page pairs of the vertices within the identified time pattern cluster, and wherein query-page pairs are semantically similar based on the following:

$$S^S(a, b) = \frac{C}{|N(a)||N(b)|} \sum_{i=1}^{|N(a)|} \sum_{j=1}^{|N(b)|} S^S(N_i(a), N_j(b))$$

where $S^s$ (a, b) represents the semantic similarity between vertex a and vertex b, N(k) represents the neighboring vertices of vertex k, $N_i$(k) represents the $i^{th}$ neighbor vertex of vertex k, and C represents a decay factor between 0 and 1 that indicates the contribution of the neighbors to the similarity of a pair of vertices.

12. The method of claim 11 including:
generating a time period graph for each time period; and
generating a time period vector graph from the generated time period bipartite graphs,
wherein the dual graph is generated from the time period vector bipartite graph.

13. The method of claim 12 including:
generating a time period graph for each time period, each time period graph having a query vertex for each distinct query of a query-page pair with a time within the time period and a page vertex for each distinct page of a query-page pair with a time within the time period and having an edge between a query vertex and a page vertex for each distinct query-page pair, each edge having an associated weight based on occurrences of that distinct query-page pair within the time period; and
generating a time period vector bipartite graph having a query vertex for each distinct query vertex in a time period bipartite graph and a page vertex for each distinct page vertex in a time period bipartite graph and having an edge for each edge between a distinct query vertex and page vertex in the time period bipartite graphs, each edge having a time period vector with an element for each time period, the elements based on the weight of the corresponding edge of the corresponding time period bipartite graph,
wherein the dual graph is generated from the time period vector bipartite graph and wherein each vertex of the dual graph has an associated time period vector.

14. The method of claim 11 wherein the semantic similarity between query-page pairs is based on similarity between neighbors of the query-page pairs.

15. The method of claim 11 wherein the time pattern similarity is based on similarity of access patterns of the query-page pairs over time.

* * * * *